(12) United States Patent
Forhan et al.

(10) Patent No.: US 7,392,428 B2
(45) Date of Patent: Jun. 24, 2008

(54) METHOD AND SYSTEM FOR RECOVERING FROM ABNORMAL INTERRUPTION OF A PARITY UPDATE OPERATION IN A DISK ARRAY SYSTEM

(75) Inventors: Carl Edward Forhan, Rochester, MN (US); Robert Edward Galbraith, Rochester, MN (US); Adrian Cuenin Gerhard, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 639 days.

(21) Appl. No.: 10/994,097

(22) Filed: Nov. 19, 2004

(65) Prior Publication Data
US 2006/0123270 A1 Jun. 8, 2006

(51) Int. Cl.
G06F 11/00 (2006.01)

(52) U.S. Cl. .................. 714/15; 714/6; 714/19

(58) Field of Classification Search ............ 707/202, 707/204; 711/162; 714/6, 15, 18, 19, 21, 714/52, 801, 54
See application file for complete search history.

(56) References Cited

U.S. PATENT DOCUMENTS

| 5,134,619 | A |   | 7/1992 | Henson et al. |
| 5,140,592 | A |   | 8/1992 | Idleman et al. |
| RE34,100 | E |   | 10/1992 | Hartness |
| 5,390,187 | A |   | 2/1995 | Stallmo |
| 5,448,719 | A |   | 9/1995 | Schultz et al. |
| 5,499,253 | A | * | 3/1996 | Lary .......................... 714/770 |
| 5,537,534 | A |   | 7/1996 | Voigt et al. |
| 5,537,567 | A |   | 7/1996 | Galbraith et al. |
| 5,617,530 | A |   | 4/1997 | Stallmo et al. |
| 5,720,025 | A |   | 2/1998 | Wilkes et al. |
| 5,754,563 | A |   | 5/1998 | White |
| 5,911,779 | A |   | 6/1999 | Stallmo et al. |
| 5,956,524 | A |   | 9/1999 | Gajjar et al. |
| 6,101,615 | A | * | 8/2000 | Lyons ........................... 714/6 |
| 6,279,050 | B1 |   | 8/2001 | Chilton et al. |
| 6,408,400 | B2 | * | 6/2002 | Taketa et al. .................... 714/5 |
| 6,480,944 | B2 | * | 11/2002 | Bradshaw et al. ........... 711/162 |

(Continued)

OTHER PUBLICATIONS

M.H. Jing et al., "A fast error and erasure correction algorithm for a simple RS-RAID", IEEE 2001, Oct. 29-Nov. 1, 2001, pp. 333-338.
IBM Technical Disclosure Bulletin, vol. 38, No. 07, Jul. 1995, pp. 455-458, "Foreground/Background Checking of Parity in a Redundant Array of Independent Disks-5 Storage Subsystem" by Faunce, M. S. et al.
Stephen J. Wicker, Error Control Systems for Digital Communications, Prentice-Hall, 1995, pp. 204-211.

*Primary Examiner*—Joshua A Lohn
(74) *Attorney, Agent, or Firm*—Wood, Herron & Evans

(57) ABSTRACT

Data associated with the state of a parity update operation in a disk array system such as a RAID-6 system is stored during performance of the operation so that, in the event the operation is interrupted, recovery may be initiated using the stored data. The stored data may include a state indicator that is indicative of the status of the parity update operation, and snapshot data (e.g., a delta value indicative of a difference between new and old data) captured during the parity update operation.

17 Claims, 4 Drawing Sheets

U.S. PATENT DOCUMENTS

| | | |
|---|---|---|
| 6,567,891 B2 | 5/2003 | Oldfield et al. |
| 6,687,872 B2 | 2/2004 | Oldfield et al. |
| 6,918,007 B2 | 7/2005 | Chang et al. |
| 6,944,791 B2 * | 9/2005 | Humlicek et al. .............. 714/6 |
| 7,111,227 B2 | 9/2006 | Oldfield et al. |
| 7,206,946 B2 * | 4/2007 | Sakakibara et al. ......... 713/300 |
| 2002/0166078 A1 * | 11/2002 | Oldfield et al. ................ 714/6 |
| 2004/0049632 A1 | 3/2004 | Chang et al. |
| 2005/0108613 A1 | 5/2005 | Kobayashi |

\* cited by examiner

METHOD AND SYSTEM FOR RECOVERING FROM ABNORMAL INTERRUPTION OF A PARITY UPDATE OPERATION IN A DISK ARRAY SYSTEM

CROSS-REFERENCE TO RELATED APPLICATIONS

This application is related to the following U.S. Patent Applications all filed on even date herewith by Carl Edward Forhan, Robert Edward Galbraith and Adrian Cuenin Gerhard: Ser. No. 10/994,088, entitled "METHOD AND SYSTEM FOR ENHANCED ERROR IDENTIFICATION WITH DISK ARRAY PARITY CHECKING," Ser. No. 10/994,099, entitled "RAID ENVIRONMENT INCORPORATING HARDWARE-BASED FINITE FIELD MULTIPLIER FOR ON-THE-FLY XOR," Ser. No. 10/994,098, entitled "METHOD AND SYSTEM FOR IMPROVED BUFFER UTILIZATION FOR DISK ARRAY PARITY UPDATES," and Ser. No. 10/994,098, entitled "METHOD AND SYSTEM FOR INCREASING PARALLELISM OF DISK ACCESSES WHEN RESTORING DATA IN A DISK ARRAY SYSTEM" Each of these applications is incorporated by reference herein.

FIELD OF THE INVENTION

The present invention relates to data protection methods for data storage and, more particularly, to systems implementing RAID-6 and similar data protection and recovery strategies.

BACKGROUND OF THE INVENTION

RAID stands for Redundant Array of Independent Disks and is a taxonomy of redundant disk array storage schemes which define a number of ways of configuring and using multiple computer disk drives to achieve varying levels of availability, performance, capacity and cost while appearing to the software application as a single large capacity drive. Typical RAID storage subsystems can be implemented in either hardware or software. In the former instance, the RAID algorithms are packaged into separate controller hardware coupled to the computer input/output ("I/O") bus and, although adding little or no central processing unit ("CPU") overhead, the additional hardware required nevertheless adds to the overall system cost. On the other hand, software implementations incorporate the RAID algorithms into system software executed by the main processor together with the operating system, obviating the need and cost of a separate hardware controller, yet adding to CPU overhead.

Various RAID levels have been defined from RAID-0 to RAID-6, each offering tradeoffs in the previously mentioned factors. RAID-0 is nothing more than traditional striping in which user data is broken into chunks which are stored onto the stripe set by being spread across multiple disks with no data redundancy. RAID-1 is equivalent to conventional "shadowing" or "mirroring" techniques and is the simplest method of achieving data redundancy by having, for each disk, another containing the same data and writing to both disks simultaneously. The combination of RAID-0 and RAID-1 is typically referred to as RAID-0+1 and is implemented by striping shadow sets resulting in the relative performance advantages of both RAID levels. RAID-2, which utilizes Hamming Code written across the members of the RAID set is not now considered to be of significant importance.

In RAID-3, data is striped across a set of disks with the addition of a separate dedicated drive to hold parity data. The parity data is calculated dynamically as user data is written to the other disks to allow reconstruction of the original user data if a drive fails without requiring replication of the data bit-for-bit. Error detection and correction codes ("ECC") such as Exclusive-OR ("XOR") or more sophisticated Reed-Solomon techniques may be used to perform the necessary mathematical calculations on the binary data to produce the parity information in RAID-3 and higher level implementations. While parity allows the reconstruction of the user data in the event of a drive failure, the speed of such reconstruction is a function of system workload and the particular algorithm used.

As with RAID-3, the RAID scheme known as RAID-4 consists of N data disks and one parity disk wherein the parity disk sectors contain the bitwise XOR of the corresponding sectors on each data disk. This allows the contents of the data in the RAID set to survive the failure of any one disk. RAID-5 is a modification of RAID-4 which stripes the parity across all of the disks in the array in order to statistically equalize the load on the disks.

The designation of RAID-6 has been used colloquially to describe RAID schemes that can withstand the failure of two disks without losing data through the use of two parity drives (commonly referred to as the "P" and "Q" drives) for redundancy and sophisticated ECC techniques. Although the term "parity" is used to describe the codes used in RAID-6 technologies, the codes are more correctly a type of ECC code rather than simply a parity code. Data and ECC information are striped across all members of the RAID set and write performance is generally lower than with RAID-5 because three separate drives must each be accessed twice during writes. However, the principles of RAID-6 may be used to recover a number of drive failures depending on the number of "parity" drives that are used.

Some RAID-6 implementations are based upon Reed-Solomon algorithms, which depend on Galois Field arithmetic. A complete explanation of Galois Field arithmetic and the mathematics behind RAID-6 can be found in a variety of sources and, therefore, only a brief overview is provided below as background. The Galois Field arithmetic used in these RAID-6 implementations takes place in $GF(2^N)$. This is the field of polynomials with coefficients in $GF(2)$, modulo some generator polynomial of degree N. All the polynomials in this field are of degree N−1 or less, and their coefficients are all either 0 or 1, which means they can be represented by a vector of N coefficients all in $\{0,1\}$; that is, these polynomials "look" just like N-bit binary numbers. Polynomial addition in this Field is simply N-bit XOR, which has the property that every element of the Field is its own additive inverse, so addition and subtraction are the same operation. Polynomial multiplication in this Field, however, can be performed with table lookup techniques based upon logarithms or with simple combinational logic.

Each RAID-6 check code (i.e., P and Q) expresses an invariant relationship, or equation, between the data on the data disks of the RAID-6 array and the data on one or both of the check disks. If there are C check codes and a set of F disks fail, $F \leq C$, the failed disks can be reconstructed by selecting F of these equations and solving them simultaneously in $GF(2^N)$ for the F missing variables. In the RAID-6 systems implemented or contemplated today there are only 2 check disks—check disk P, and check disk Q. It is worth noting that the check disks P and Q change for each stripe of data and parity across the array such that parity data is not written to a dedicated disk but is, instead, striped across all the disks.

Even though RAID-6 has been implemented with varying degrees of success in different ways in different systems, there remains an ongoing need to improve the efficiency and costs of providing RAID-6 protection for data storage. The mathematics of implementing RAID-6 involve complicated calculations that are also repetitive. Accordingly, efforts to improve the simplicity of circuitry, the cost of circuitry and the efficiency of the circuitry needed to implement RAID-6 remains a priority today and in the future.

For example, one drawback associated with existing RAID-6 systems relates to recovery from abnormal events such as unexpected losses of power, media errors or storage device failures, etc. that complicate keeping data and parity synchronized. In particular, during a parity update operation, where new data is written to a disk in a disk array and the parity for the associated parity stripe is updated accordingly, a risk exists that the operation may be interrupted at an intermediate point, and prior to completion.

In a RAID-6 environment, for example, a parity update operation typically incorporates reading in the old data that will be overwritten by new data, XOR'ing the old data with the new data to create a delta value, writing the new data to the disk array, multiplying the delta value by a constant $K_1$, reading and XOR'ing the old P parity value with the product of the delta value and the constant $K_1$ to generate the new P parity value, writing the new P parity value to the disk array, multiplying the delta value by a constant $K_2$, reading and XOR'ing the old Q parity value with the product of the delta value and the constant $K_2$ to generate the new Q parity value, and writing the new Q parity value to the disk array. Interruption of the parity update operation prior to completion of the above steps often results in the parity and data becoming out of sync, and risking the corruption of the data, parity or both.

Furthermore, when a disk array becomes exposed, i.e., where the data or parity stored on at least one disk can no longer be trusted or is no longer available, recovery from interruptions becomes even more problematic. If, for example, in a RAID-6 disk array, one disk is exposed, recovery from interruption of a parity update operation directed to another disk cannot rely on the data stored on the exposed disk as such data is not trusted or available.

SUMMARY OF THE INVENTION

The invention addresses these and other problems associated with the prior art by storing data associated with the state of a parity update operation during performance of the operation so that recovery may be initiated using the stored data. In particular, embodiments consistent with the invention maintain a state indicator during a parity update operation that is indicative of the status of the parity update operation, and capture and store snapshot data (e.g., a delta value indicative of a difference between new and old data) during the parity update operation in non-volatile memory. Then, should the parity update operation be interrupted, the state indicator and snapshot data may be used to synchronize parity and data in the disk array in connection with recovering from the interrupted parity update operation.

DETAILED DESCRIPTION

Figure 1:
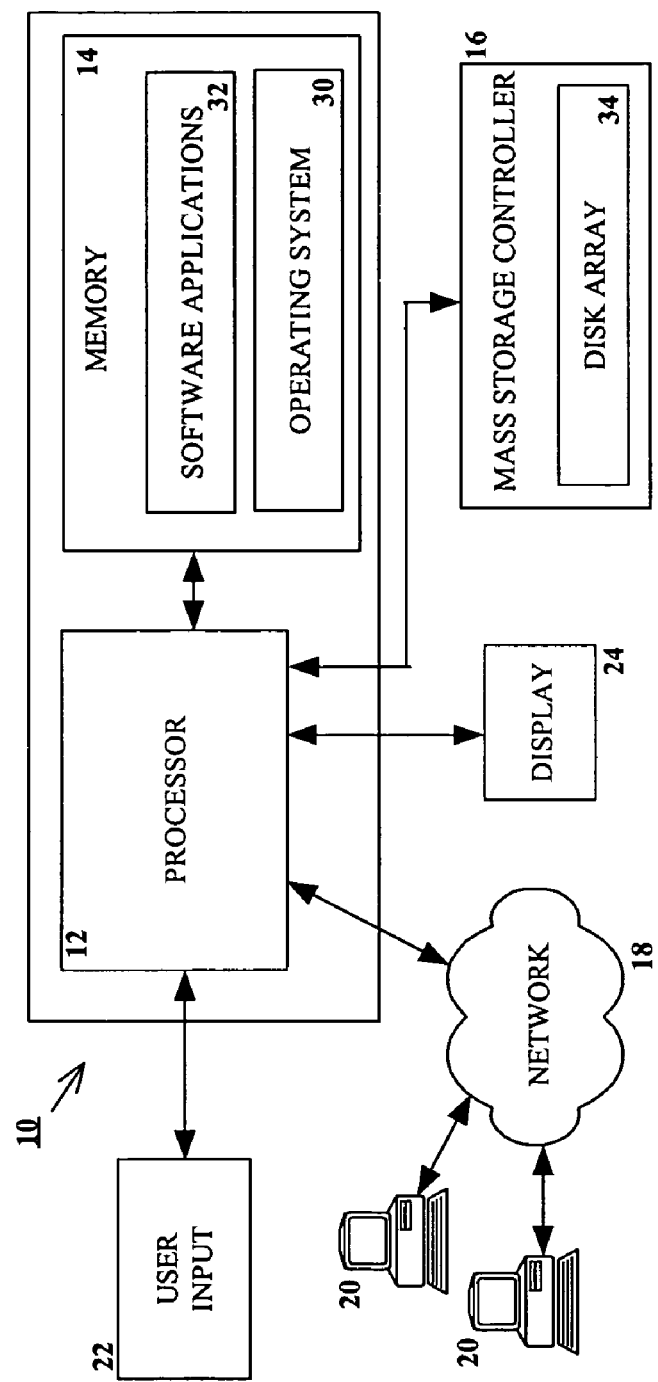
FIG. 1 is a block diagram of an exemplary computer system that can implement a RAID-6 storage controller in accordance with the principles of the present invention.

The embodiments discussed hereinafter store state data associated with a parity update operation during performance of the parity update operation to facilitate recovery in the event of an abnormal event that interrupts the parity update operation. The stored data includes a state indicator that indicates the current status of the parity update operation at various points during the progress of the operation. The stored data also includes snapshot data captured during the parity update operation and stored in non-volatile memory. The snapshot data may include any number of types of data that may be of use in rolling forward or rolling back an interrupted parity update operation, e.g., delta data, delta data multiplied by a constant, old data, old parity, new parity, etc.

While other types of snapshot data may be captured, the embodiments discussed hereinafter capture and store a delta value, which is representative of the difference between new data being written to a disk by the parity update operation, and the old data previously stored on the disk and being overwritten by the new data in connection with the parity update operation. In the embodiments discussed hereinafter, this difference is generated via an XOR operation between the old and new data.

Presented hereinafter are a number of embodiments of a disk array environment implementing parity update operations and recovery techniques therefor consistent with the invention. However, prior to discussing such embodiments, a brief background on RAID-6 is provided, followed by a description of an exemplary hardware environment within which such operations and techniques may be implemented.

General RAID-6 Background

The nomenclature used herein to describe RAID-6 storage systems conforms to the most readily accepted standards for this field. In particular, there are N drives of which any two are considered to be the parity drives, P and Q. Using Galois Field arithmetic, two independent equations can be written:

$$\alpha_0 d_0 + \alpha^0 d_1 + \alpha^0 d_2 + \ldots + \alpha^0 d_{N-1} = 0 \qquad (1)$$

$$\alpha_0 d_0 + \alpha^1 d_1 + \alpha^2 d_2 + \ldots + \alpha^{N-1} d_{N-1} = 0 \qquad (2)$$

where the "+" operator used herein represents an Exclusive-OR (XOR) operation.

In these equations, $\alpha^x$ is an element of the finite field and $d_x$ is data from the x$th$ disk. While the P and Q disk can be any of the N disks for any particular stripe of data, they are often noted as $d_P$ and $d_Q$. When data to one of the disks (i.e., $d_X$) is updated, the above two equations resolve to:

$$\Delta = (\text{old } d_X) + (\text{new } d_X) \qquad (3)$$

$$(\text{new } d_P) = (\text{old } d_P) + ((\alpha^Q + \alpha^X)/(\alpha^P + \alpha^Q))\Delta \qquad (4)$$

$$(\text{new } d_Q) = (\text{old } d_Q) + ((\alpha^P + \alpha^X)/(\alpha^P + \alpha^Q))\Delta \qquad (5)$$

In each of the last two equations the term to the right of the addition sign is a constant multiplied by the change in the data (i.e., $\Delta$). These terms in equations (4) and (5) are often denoted as $K_1 \Delta$ and $K_2 \Delta$, respectively.

In the case of one missing, or unavailable drive, simple XOR'ing can be used to recover the drive's data. For example, if $d_1$ fails then $d_1$ can be restored by $$d_1 = d_0 + d_2 + d_3 + \ldots \tag{6}$$

In the case of two drives failing, or being "exposed", the above equations can be used to restore a drive's data. For example, given drives 0 through X and assuming drives A and B have failed, the data for either drive can be restored from the remaining drives. If for example, drive A was to be restored, the above equations reduce to:

$$d_A = ((\alpha^B + \alpha^0)/(\alpha^B + \alpha^A))d_0 + ((\alpha^B + \alpha^1)/(\alpha^B + \alpha^A))d_1 + \ldots + ((\alpha^B + \alpha^X)/(\alpha^B + \alpha^A))d_X \tag{7}$$

Exemplary Hardware Environment

With this general background of RAID-6 in mind, attention can be turned to the drawings, wherein like numbers denote like parts throughout the several views. FIG. 1 illustrates an exemplary computer system in which a RAID-6, or other disk array, may be implemented. For the purposes of the invention, apparatus 10 may represent practically any type of computer, computer system or other programmable electronic device, including a client computer, a server computer, a portable computer, a handheld computer, an embedded controller, etc. Moreover, apparatus 10 may be implemented using one or more networked computers, e.g., in a cluster or other distributed computing system. Apparatus 10 will hereinafter also be referred to as a "computer", although it should be appreciated the term "apparatus" may also include other suitable programmable electronic devices consistent with the invention.

Computer 10 typically includes at least one processor 12 coupled to a memory 14. Processor 12 may represent one or more processors (e.g., microprocessors), and memory 14 may represent the random access memory (RAM) devices comprising the main storage of computer 10, as well as any supplemental levels of memory, e.g., cache memories, non-volatile or backup memories (e.g., programmable or flash memories), read-only memories, etc. In addition, memory 14 may be considered to include memory storage physically located elsewhere in computer 10, e.g., any cache memory in a processor 12, as well as any storage capacity used as a virtual memory, e.g., as stored on the disk array 34 or on another computer coupled to computer 10 via network 18 (e.g., a client computer 20).

Computer 10 also typically receives a number of inputs and outputs for communicating information externally. For interface with a user or operator, computer 10 typically includes one or more user input devices 22 (e.g., a keyboard, a mouse, a trackball, a joystick, a touchpad, and/or a microphone, among others) and a display 24 (e.g., a CRT monitor, an LCD display panel, and/or a speaker, among others). Otherwise, user input may be received via another computer (e.g., a computer 20) interfaced with computer 10 over network 18, or via a dedicated workstation interface or the like. For additional storage, computer 10 may also include one or more mass storage devices accessed via a storage controller, or adapter, 16, e.g., removable disk drive, a hard disk drive, a direct access storage device (DASD), an optical drive (e.g., a CD drive, a DVD drive, etc.), and/or a tape drive, among others. Furthermore, computer 10 may include an interface with one or more networks 18 (e.g., a LAN, a WAN, a wireless network, and/or the Internet, among others) to permit the communication of information with other computers coupled to the network. It should be appreciated that computer 10 typically includes suitable analog and/or digital interfaces between processor 12 and each of components 14, 16, 18, 22 and 24 as is well known in the art.

In accordance with the principles of the present invention, the mass storage controller 16 advantageously implements RAID-6 storage protection within an array of disks 34.

Computer 10 operates under the control of an operating system 30, and executes or otherwise relies upon various computer software applications, components, programs, objects, modules, data structures, etc. (e.g., software applications 32). Moreover, various applications, components, programs, objects, modules, etc. may also execute on one or more processors in another computer coupled to computer 10 via a network 18, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable signal bearing media used to actually carry out the distribution. Examples of computer readable signal bearing media include but are not limited to recordable type media such as volatile and non-volatile memory devices, floppy and other removable disks, hard disk drives, magnetic tape, optical disks (e.g., CD-ROM's, DVD's, etc.), among others, and transmission type media such as digital and analog communication links.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Figure 2:
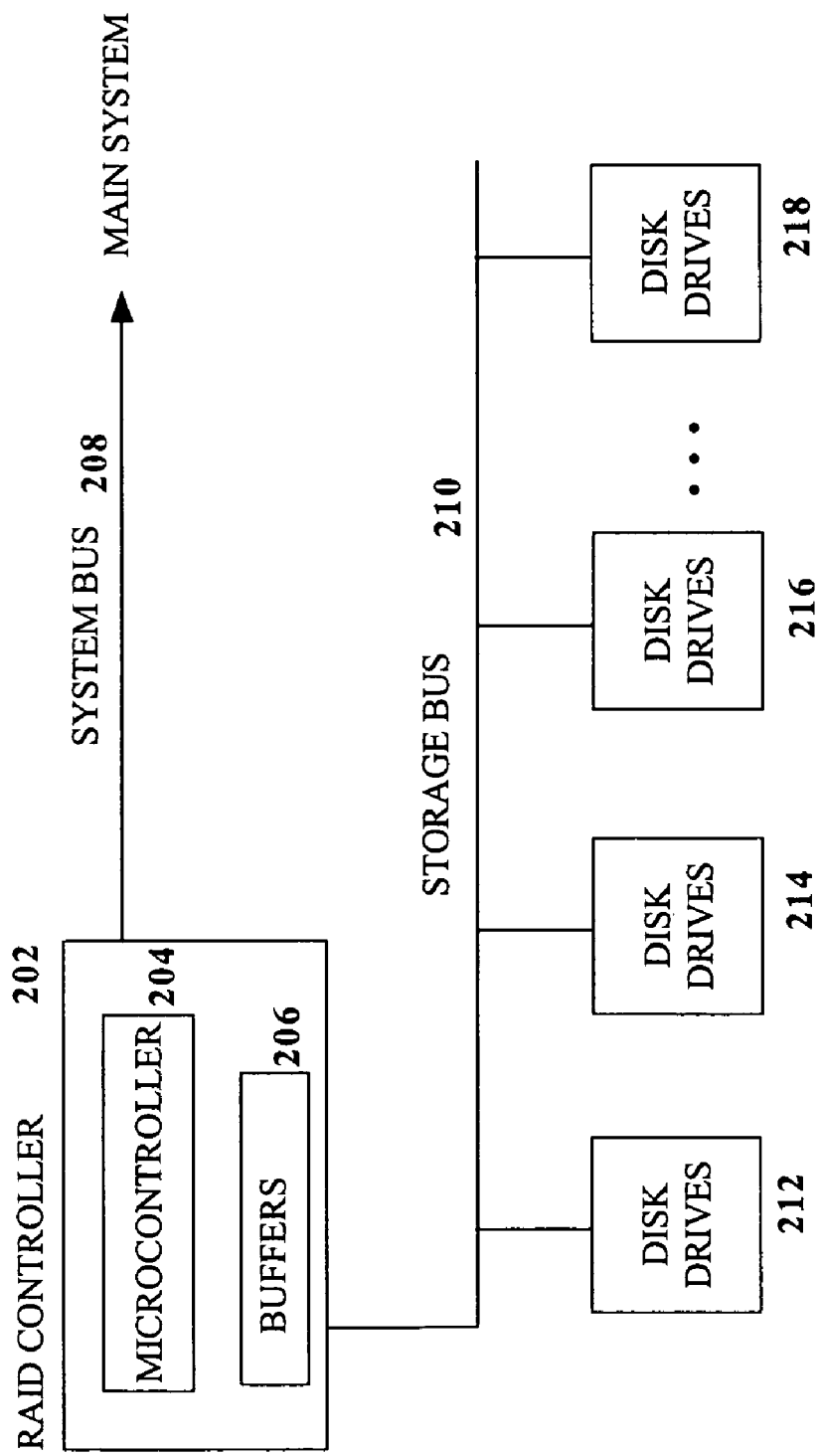
FIG. 2 is a block diagram illustrating the principal components of the RAID controller of FIG. 1.

FIG. 2 illustrates a block diagram of the control subsystem of a disk array system, e.g., a RAID-6 compatible system. In particular, the mass storage controller 16 of FIG. 1 is shown in more detail to include a RAID controller 202 that is coupled through a system bus 208 with the processor 12 and through an interface comprising a storage bus 210 to various disk drives 212-218. As known to one of ordinary skill, these buses may be proprietary in nature or conform to industry standards such as SCSI-1, SCSI-2, etc. The RAID controller includes a microcontroller 204 that executes program code that implements the RAID-6 algorithm for data protection, and that is typically resident in memory located in the RAID controller. In particular, data to be stored on the disks 212-218 is used to generate parity data and then broken apart and striped across the disks 212-218. The disk drives 212-218 can be individual disk drives that are directly coupled to the controller 202 through the bus 210 or may include their own disk drive adapters that permit a string a individual disk drives to be connected to the storage bus 210. In other words, a disk drive 212 may be physically implemented as 4 or 8 separate disk drives coupled to a single controller connected to the bus 210. As data is exchanged between the disk drives 212-218 and the RAID controller 202, in either direction, buffers 206 are provided to assist in the data transfers. The utilization of the buffers 206 can sometimes produce a bottle neck in data transfers and the inclusion of numerous buffers may increase cost, complexity and size of the RAID controller 202. Thus, certain embodiments of the present invention relate to provision and utilizing these buffers 206 in an economical and efficient manner.

It will be appreciated that the embodiment illustrated in FIGS. 1 and 2 is merely exemplary in nature. For example, it will be appreciated that the invention may be applicable to other disk array environments where parity update operations are performed. It will also be appreciated that a disk array environment consistent with the invention may utilize a completely software-implemented control algorithm resident in the main storage of the computer, or that some functions handled via program code in a computer or controller can be implemented in hardware logic circuits, and vice versa. Therefore, the invention should not be limited to the particular embodiments discussed herein.

Recovering from Abnormal Interruption of Parity Update Operations

While RAID-6 systems, under normal circumstances, effectively provide protection against two disk failures, there are some abnormal events that might introduce conditions in which there is uncertainty whether the parity and data information is properly synchronized. For example, unexpected loss of power or media errors can occur at times that affect the synchronization of the data. One of the most vulnerable times is when new data has been written to a disk and the P and Q parity data are being updated.

Figure 3:
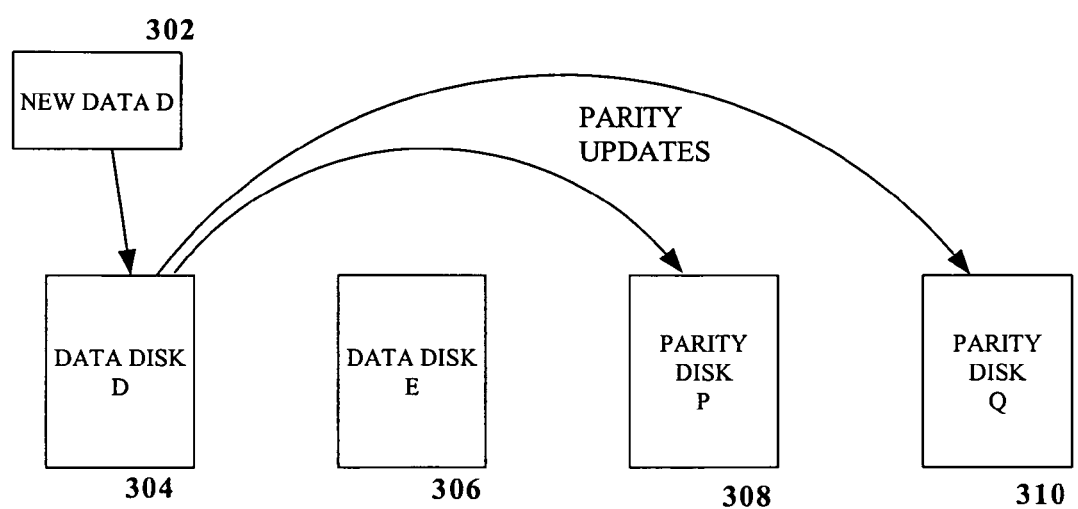
FIG. 3 depicts a schematic diagram of a four-disk RAID-6 array performing a parity update operation.

In RAID 6, six I/O operations are generated for every standard parity update operation:

1) read old data, $d_x$
2) write new data, $d_x$
3) read old parity, $d_P$
4) write new parity, $d_P$
5) read old parity, $d_Q$ and
6) write new parity, $d_Q$ If an abnormal event, such as unexpected loss of power, occurs at any time during this process, the state of the data and the parity information may be unknown. Upon the restoration of power the controller is configured to automatically detect the abnormal state of the previous update operation and initiate a recovery process. Thus, a RAID-6 controller, in accordance with the principles of the present invention, is able to automatically resynchronize the data and parity information even after an abnormal interruption FIG. 3 depicts an exemplary disk array having two data drives 304, 306 (D, E) and two parity drives 308, 310 (P, Q). One of ordinary skill will appreciate that this array is exemplary in nature and arrays of many different numbers of disks are contemplated within the scope of the present invention.

When no drives are exposed, recovering from abnormal events is relatively straightforward. For example, if disk D 304 is completely updated with the new data 302 and P is in the process of being modified when an abnormal event occurs, then the following facts are known about the data:

1) D on the disk 304 is the new data;
2) P is in doubt, it may be correct or it may not;
3) Q is correct but is for the old data that was on disk D; and
4) E is known and is unchanged.

Using the new D and the unchanged E, the controller can calculate the new P and Q as if the abnormal event never occurred using equation (7) and treating P and Q as if they were exposed. However, if one of the drives is exposed, then the task becomes more complicated. In the above example, if disk E 306 is exposed, then calculating P and Q is not the same straightforward exercise. Accordingly embodiments of the present invention relate to a RAID-6 controller that permits synchronizing of data and parity after an occurrence of an abnormal event during parity updating, even when one or more drives are exposed.

The controller uses two pieces of nonvolatile information: a "parity update footprint" and a snapshot of the data during the parity update in order to recover from an abnormal event. Conventional RAID-6 implementations already include functionality of a normal parity update footprint that stores information about a particular update operation in non-volatile memory while an update operation is being performed. This typical footprint includes information about the logical block address of the update, the length of the update, the device ID, etc. In addition to this information, embodiments of the present invention advantageously include information within the footprint about the state of the ongoing update operation.

In accordance with one embodiment of the present invention, there are four valid states of the parity update operation:

1) Data in Doubt—data is in doubt and P and Q are old;
2) P in Doubt—D is new, Q is old, P is in doubt;
3) P in doubt and Δ—D is new, Q is old, P is in doubt, but the delta value (Δ) is known;
4) Q in Doubt—D is new, P is new, Q is in doubt.

Returning to FIG. 3, the following sequence of events occur during a parity update in accordance with the principles of the present invention:

a) when new data D, 302 is to be written to the data disk D 304, the controller acquires a semaphore for the footprint and the delta value (Δ); thus these values cannot be changed by another process while the semaphore is being held;

b) the controller XOR's old D with new D and stores this delta value (Δ) in a buffer;

c) the controller sets the footprint state to Data in Doubt;

d) the controller writes the new D to the data disk D 304;

e) desirably, if there is an exposed disk, the delta value Δ is written to non-volatile memory, e.g., to disk D, the location desirably a default location so that during a recovery operation, the controller automatically can retrieve the saved Δ value;

f) the controller multiplies Δ by the constant $K_1$;

g) the controller XOR's the old P with $K_1 \Delta$ and stores the new P in a buffer;

h) the controller sets the footprint state to P in doubt (or P in doubt with Δ, if there is an exposed drive);

i) the controller writes the new P on disk 308;

j) the controller sets the footprint state to Q in doubt;

k) the controller multiplies Δ by the constant $K_2$;

l) the controller XOR's the old Q with $K_2 \Delta$ and stores the new Q in a buffer;

m) the controller stores the new Q on disk 310;

n) the controller releases the semaphore.

Table I below summarizes the possible failure scenarios that may occur given the steps of the parity update process and the different "states" that are defined for an update process. In particular, the table refers to an update process involving writing new data to disk D, 304. Thus, in the table the reference "other" refers to some disk other than D 304, P 308 and Q 310 (e.g., disk E 306). The columns of the table indicate the different states and the rows indicate different conditions that may be present within the RAID array. The value of each element of the table represents the corrective procedure that will resynchronize the data and the parity information. "Resync P and Q" refers to using the data devices (e.g., D and E) to regenerate P and Q parity. "Rebuild D" refers to using the devices (except disk D) to regenerate D data. "Rebuild Q" refers to using the devices except disk Q to regenerate Q (P can be rebuilt in an analogous manner as well).

TABLE I

| Exposed Device(s) | Data in Doubt | P in Doubt or, if E is exposed, P in Doubt with Δ | Q in Doubt |
|---|---|---|---|
| None | Resync P and Q | Resync P and Q | Resync P and Q |
| D | None | Resync P and Q | Rebuild Q |
| P | Resync P and Q | Resync P and Q | Resync P and Q |
| Q | Resync P and Q | Resync P and Q | None |
| Other | Rebuild D | ACTION | Rebuild Q |
| D and P | None | Resync P and Q | Resync P and Q |
| D and Q | None | Resync P and Q | None |
| P and Q | None | Resync P and Q | None |
| D and Other | None | Resync P and Q | Resync P and Q |
| P and Other | Resync P and Q | Resync P and Q | Resync P and Q |
| Q and Other | Resync P and Q | Resync P and Q | None |
| 2 Others | Resync P and Q | Resync P and Q | Resync P and Q |

In almost all the failure scenarios that may occur during the parity update operation, enough information is known about the data that parity information can be easily resynchronized or data from the data drives can be rebuilt using the traditional equations for calculating P and Q, such that the data and parity are returned to synchronization. In one particular failure scenario, however, recovery is not straightforward. If, in FIG. 3, Disk E 306 is exposed, it is complicated to resync all the data and parity if P is in doubt.

If such a failure occurs, then E is unavailable, the new value of D is known, Q is an old value and P is uncertain. This combination of values does not permit use of any of the conventional parity calculation equations to resynchronize the data and the parity information without loss of data for E. In the above table this recovery solution is labeled "ACTION". In this case, recovery is accomplished according to the following steps:

a) the new data value D is read from the disk into a buffer;
b) the new data value D is XOR'ed with the Δ that was written to disk D and recovered (alternatively, Δ may be written to a variety of different non-volatile storage areas, e.g., on another disk, or in a non-volatile memory in the controller, an adapter, or other component);
c) the buffer now contains the old data value D;
d) the old D is then written to the data disk D; and
e) parity P is then rebuilt.

Thus, the parity and data are once again synchronized. From this point, the controller can once again attempt to update the disk D with the new data value.

In many RAID control systems, routines exist that perform resynchronization of P and Q when needed. Thus, in some instances, if only P needs to be resynchronized, the controller still performs a resync of both P and Q. The table above employs a similar convention; in some recovery scenarios only one of the P and Q values actually need resyncing. However, the table indicates that both P and Q are re-synced. Even in instances where P or Q may be an exposed drive, RAID control systems typically perform a "resync P and Q" that results in P and Q being generated but any data for an exposed drive is simply not written out. One of ordinary skill will recognize that the above table relies on some of these conventional controller routines but that resynchronization of P and Q could be performed separately without departing from the scope of the present invention.

It will be appreciated that in the event that two disks are exposed, a resynchronization of P and Q may potentially result in known data loss in some embodiments of the invention. However, in contrast to conventional designs, when only one disk is exposed, P and Q may be resynchronized in embodiments consistent with the invention without a risk of data loss.

Figure 4:
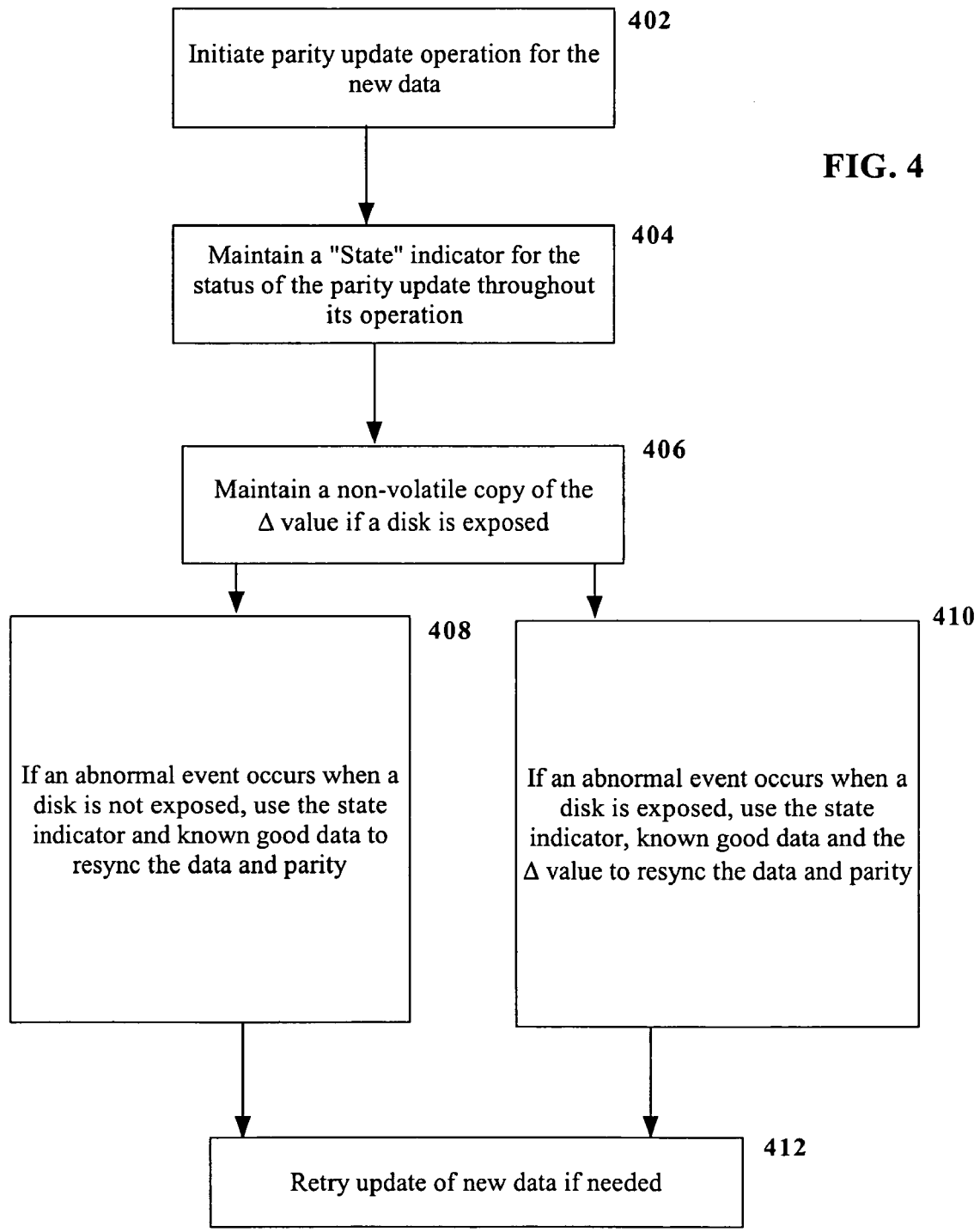
FIG. 4 illustrates a flowchart of an exemplary method for recovering from an abnormal interruption of a parity update operation in a RAID-6 environment in accordance with the principles of the present invention.

FIG. 4 illustrates a flowchart of an exemplary algorithm for providing the RAID-6 recovery capability described above. In step 402, the writing of new data to a data disk initiates a parity update operation. During the parity update operation, a state indicator is maintained, in step 404, that indicates the status of the parity operation as it progresses towards completion. Also, in step 406, a non-volatile copy of the Δ value is stored in case it is needed for the recovery process, e.g., if a disk is exposed. In some embodiments, a non-volatile copy of the Δ value is stored even when no disk is exposed, while in other embodiments, a non-volatile copy of the Δ value is stored only when a disk is known to be exposed.

In the event that an abnormal event occurs that interrupts the completion of the parity update, then the controller will need to restore the data and parity information to a state in which they are synchronized.

The ease in which such resynchronization can occur depends on whether the disk array has an exposed drive or not. If there is no exposed drive, then, in step 408, the controller uses the state indicator to determine which information that is known to be good and to resynchronize the data and parity using this information. If there is an exposed drive, however, then, in step 410, the controller uses the state indicator and the saved Δ to resynchronize the data and parity information. Once the data and parity are restored to a synchronized state, then the controller may try once again, in step 412, to perform the update of D if necessary.

Thus, embodiments of the present invention provide a method and system, within a RAID-6 or similar disk array environment, that can correctly recover from an abnormal interruption of a parity update operation even when a disk in the array is exposed. Various modifications may be made to the illustrated embodiments without departing from the spirit and scope of the invention. Therefore, the invention lies in the claims hereinafter appended.

What is claimed is:

1. A method of storing data in a disk array system, the method comprising the steps of:
   initiating a parity update operation in association with storing new data;
   maintaining a state indicator during the parity update operation, the state indicator indicative of a status of the parity update operation;
   capturing snapshot data during the parity update operation; and storing the snapshot data in non-volatile memory.

2. The method of claim 1, wherein the parity update operation includes:
   updating the new data;
   updating a first parity value associated with the new data; and
   updating a second parity value associated with the new data.

3. The method of claim 2, wherein the state indicator comprises at least three states, a first of which indicating that the new data is in doubt, a second of which indicating that the first parity value is in doubt, and the third of which indicating that the second parity value is in doubt.

4. The method of claim 1, wherein initiating the parity update operation is performed while a disk other than that to which the new data is being written is exposed.

5. The method of claim 4, wherein the state indicator includes a state that indicates that a parity value is in doubt but that the snapshot data is available.

6. The method of claim 1, wherein the step of maintaining further includes the steps of:
   storing the state indicator in non-volatile memory; and
   updating the state indicator to one of a plurality of states as the parity update operation progresses.

7. The method of claim 1, wherein the snapshot data comprises a delta value, the delta value indicative of a difference between the new data and old data being overwritten by the new data.

8. The method of claim 1, further comprising the step of:
   acquiring a semaphore to protect the state indicator and the snapshot data.

9. The method of claim 1, wherein the step of maintaining includes the step of creating a parity update footprint in non-volatile memory, the footprint including the state indicator.

10. The method of claim 1, wherein the snapshot data is stored in a predetermined location on the disk on which the parity update operation is being performed.

11. The method of claim 1, further comprising the steps of:
    determining the parity update operation was interrupted before completing; and
    based upon the determination, synchronizing parity and data in the disk array system using at least one of the state indicator and the snapshot data.

12. The method of claim 11, wherein the step of synchronizing includes at least one of:
    regenerating a data disk using other disks in the disk array system; and
    regenerating a parity value using other disks in the disk array system.

13. The method of claim 1, further comprising the steps of:
    determining the parity update operation was interrupted in a state where a first disk is exposed and a parity value is in doubt; and
    based upon the determination, synchronizing parity and data in the disk array system using the state indicator and the snapshot data.

14. The method of claim 13, wherein the snapshot data comprises a delta value indicative of a difference between the new data and old data being overwritten by the new data, and wherein the step of synchronizing further includes the steps of:
    calculating the old data based on the delta value and the new data;
    writing the old data to a disk in the disk array system; and
    rebuilding a parity value using the old data.

15. The method of claim 14, further comprising the steps of:
    determining a state of the parity update operation based on the state indicator; and
    recovering the delta value from non-volatile memory.

16. The method of claim 1, wherein the disk array system comprises a RAID-6 system.

17. A method of recovering from an interruption in a parity update operation being performed in a disk array system, the method comprising the steps of:
    retrieving a state indicator maintained during the parity update operation, the state indicator being indicative of a status of the parity update operation;
    retrieving from non-volatile memory snapshot data captured during the parity update operation; and
    synchronizing parity and data in the disk array system using at least one of the state indicator and the snapshot data.

* * * * *